US006816361B2

(12) United States Patent
Kuo

(10) Patent No.: US 6,816,361 B2
(45) Date of Patent: Nov. 9, 2004

(54) COMPUTER WITH A DETACHABLE LIQUID CRYSTAL DISPLAY

(75) Inventor: Yan-Lin Kuo, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 255 days.

(21) Appl. No.: 10/063,080

(22) Filed: Mar. 17, 2002

(65) Prior Publication Data

US 2003/0090866 A1 May 15, 2003

(30) Foreign Application Priority Data

Nov. 15, 2001 (TW) .......................................... 90128374 A

(51) Int. Cl.⁷ ................................................ H05K 7/20
(52) U.S. Cl. ...................... 361/681; 361/683; 361/687; 361/695; 349/58; 248/917
(58) Field of Search ................................ 361/681–683, 361/687, 690, 692, 695, 680; 248/917; 415/213.1, 214.1; 349/58; 454/184; 312/223.1, 223.2, 223.3; 165/80.3, 121–126

(56) References Cited

U.S. PATENT DOCUMENTS 5,294,994 A * 3/1994 Robinson et al. ........... 348/825
6,188,569 B1 * 2/2001 Minemoto et al. .......... 361/683
6,188,659 B1   2/2001 Mueller et al.
6,366,452 B1 * 4/2002 Wang et al. ................. 361/681
D469,085 S  * 1/2003 Hill et al. ................... D14/337
6,563,705 B1 * 5/2003 Kuo ............................ 361/687
6,697,250 B2 * 2/2004 Kuo ............................ 361/681
2003/0063059 A1 * 4/2003 Farrow et al. ................ 345/92
2003/0063432 A1 * 4/2003 Farrow et al. .............. 361/680

FOREIGN PATENT DOCUMENTS

TW            331428        5/1998

* cited by examiner

Primary Examiner—Michael Datskovsky
(74) Attorney, Agent, or Firm—Winston Hsu

(57) ABSTRACT

A desktop computer has a pedestal, a front housing, a motherboard, a display, and a rear cover. The pedestal is used to support the desktop computer on a desk. The bottom of the front housing is pivotally mounted on the pedestal and tilt-able in a forward-backward direction. The front housing has a front panel facing a user, a top panel horizontally fixed on a top edge of the front panel, and a bottom panel horizontally fixed on a bottom edge of the front panel. The display is fixed vertically on a front side of the front panel. The desktop computer combines the display with the computer housing so as to decrease the volume and simplify the structure. Furthermore, since the display is detachable fixed on the computer housing, the maintenance and the replacement of the display are easier and feasible.

9 Claims, 6 Drawing Sheets

COMPUTER WITH A DETACHABLE LIQUID CRYSTAL DISPLAY

BACKGROUND OF INVENTION

1. Field of the Invention

The present invention relates to a desktop computer, and more particularly, to an all-in-one desktop computer with a detachable liquid crystal display.

2. Description of the Prior Art

Personal computers are rapidly becoming common household items and may eventually join the ranks of the television in prevalence. A desktop computer traditionally comprises a relatively large rectangular central processing unit (CPU) housing within which the motherboard, various drives, input/output devices, and other components of the computer are housed. Additionally, the desktop computer further includes a monitor such as a cathode ray tube (CRT) display or a liquid crystal display (LCD), a keyboard, a mouse, speakers, and so forth. In general, the conventional desktop computer is relatively heavy and bulky. Many desktop work surfaces are spatially overwhelmed with the CPU housing, keyboard, mouse, and a printer. Furthermore, the desktop computer is difficult to move from one location to another. The desktop computer has various external cables and cords. Once these cords and cables have been connected to their respective components, the computer user is often reluctant to move the computer to a new location. In addition to the complexity of routing the cables and cords, the desktop computer is also cumbersome to move due to its large size, multiple components, and considerable weight.

Accordingly, a so-called all-in-one LCD personal computer has been developed recently. This new computer, which is exemplified by the 3000 series Compaq Presario brand computer, has an LCD display mounted directly on a computer casing, thereby eliminating the cords and cables between the casing and monitor. The LCD display and casing are supported together on a single base that can be placed onto a desk surface. Nevertheless, the combination of the casing and LCD display still consumes a fairly large amount of space on a desk, and is still rather large and heavy. A further disadvantage with this type of computer is that the structure of the computer is fairly fixed. The casing cannot pivot relative to the base and the LCD display only provides a fairly limited range of motion relative to the casing. A user may therefore find it difficult to adjust the display to an optimal viewing angle.

Furthermore, since each of the devices of the conventional desktop computer is independent, the monitor can be replaced with another one with a different size according to a user's requirement. For example, when the user desires to see movies through the computer, a monitor with a large dimension would be most suitable for ensuring viewing comfort. Conversely, when the user deals with general computer documents, a monitor with a small size should be enough. However, since the LCD display has been fixed on the casing of the all-in-one LCD personal computer, the replacement of the monitor with other monitors of different sizes is impossible.

SUMMARY OF INVENTION

It is therefore a primary objective of the claimed invention to provide a computer with a detachable liquid crystal display to solve the above-mentioned problems.

According to the claimed invention, a desktop computer comprises a pedestal, a front housing, a motherboard, a display, and a rear cover. The pedestal is used to support the desktop computer on a desk. The bottom of the front housing is pivotally mounted on the pedestal and tilt-able in a forward-backward direction. The front housing has a front panel facing a user, a top panel horizontally fixed on a top edge of the front panel facing a backward direction, and a bottom panel horizontally fixed on a bottom edge of the front panel facing a backward direction. The front, top, and bottom panels form a recess with an opening facing a rear end of the front housing. The motherboard is fixed vertically on a rear side of the front panel and between the top and bottom panels. A central processing unit (CPU) and at least a memory module are installed on the motherboard for controlling the desktop computer. The display is fixed vertically on a front side of the front panel and comprises a metal frame having a squared rear panel fixed vertically on the front side of the front panel of the front housing, and four front flanges fixed on four front edges of the squared rear panel. The squared rear panel and the four front flanges form a squared recess facing a forward direction. The flat display panel is electrically connected to the motherboard and has a front side for displaying images and a rear side fixed vertically inside the squared recess of the metal frame. The plastic cover is fixed on a front side of the metal frame for covering a periphery of the metal frame. An opening is installed on a front end of the plastic cover for displaying the images of the flat display panel. The rear cover is installed on the rear end of the front housing for covering the recess on the rear end of the front housing.

It is an advantage of the claimed invention that the desktop computer combines the display with the computer housing so as to decrease the volume and simplify the structure. Furthermore, since the display of the claimed invention is detachable fixed on the computer housing, the maintenance and the replacement of the display are easier and feasible.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
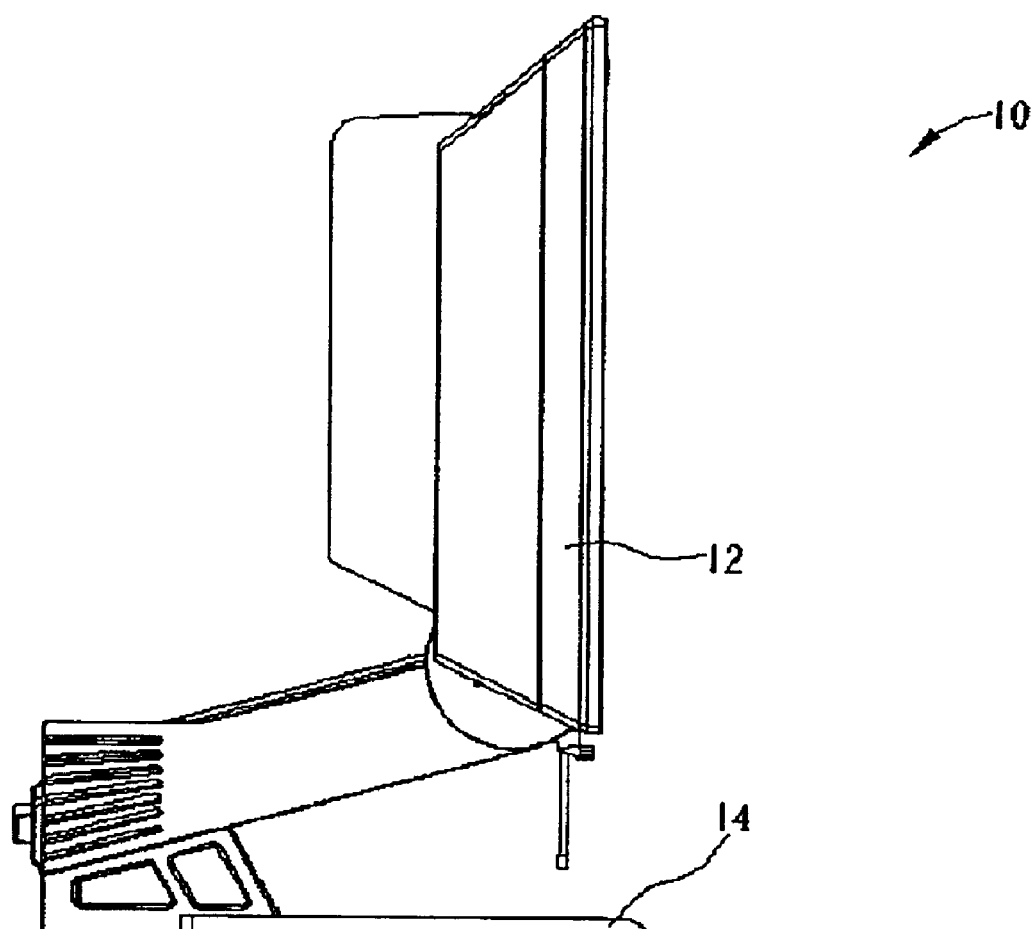
FIG. 1 is a side view of a desktop computer according to the present invention.

Please refer to FIG. 1. FIG. 1 is a side view of a desktop computers 10 according to the present invention. The desktop computer can be divided into two parts: a main computer 12 and a pedestal 14. According to the preferred embodiment of the present invention, the main computer 12 is installed on the pedestal 14 and integrates various devices of a general computer such as a central processing unit (CPU), a memory module, and so forth within the main computer 12. The pedestal 14 is used for supporting the main computer 12 on a desk.

Figure 2:
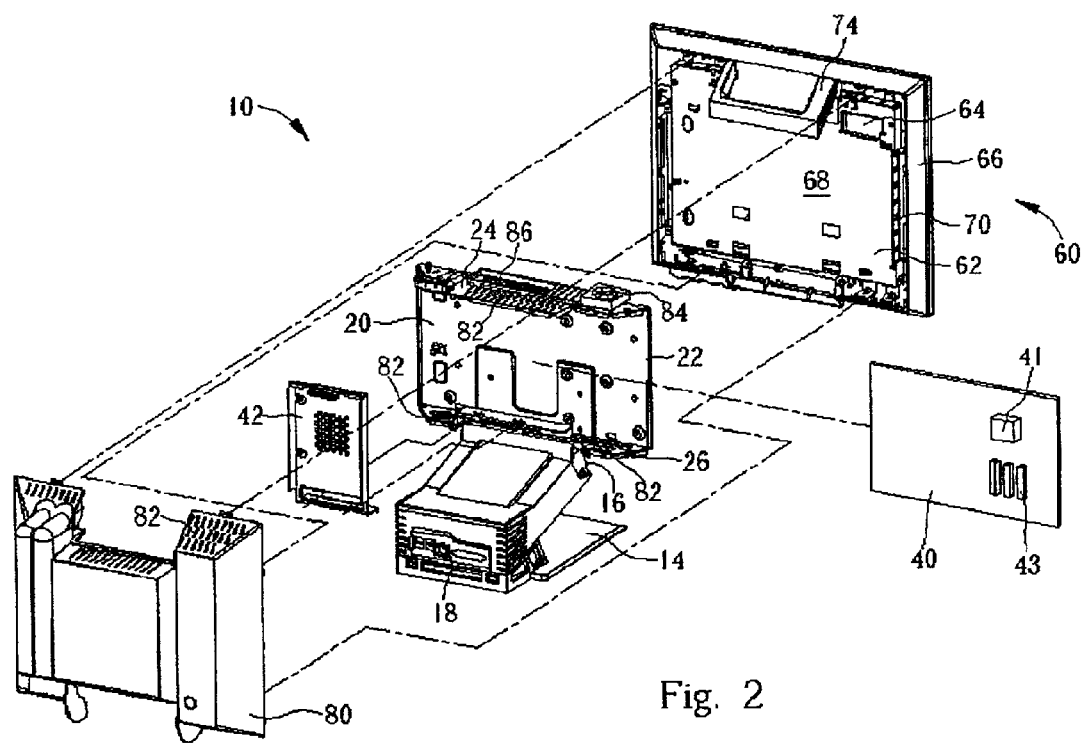
FIG. 2 is an exploded view of the desktop computer shown in FIG. 1.

Please refer to FIG. 2 for a detailed description of the structure of the desktop computer 10. FIG. 2 is an exploded view of the desktop computer 10 shown in FIG. 1. The desktop computer 10 comprises a pedestal 14, a front housing 20, a motherboard 40, a display 60, and a rear cover 80. First, a slot 16 facing a forward direction is installed inside the pedestal 14 for installing a compact disc drive. Moreover, several input/output ports 18 are installed on a rear side of the pedestal 14 for connecting various external devices such as a printer and other input/output devices.

Furthermore, the bottom of the front housing 20 is pivotally mounted on the pedestal 14 and tilt-able in a forward-backward direction. The front housing 20 comprises a front panel 22 facing a user, a top panel 24 horizontally fixed on a top edge of the front panel 22 facing a backward direction, and a bottom panel 26 horizontally fixed on a bottom edge of the front panel 22 facing a backward direction. Meanwhile, the front panel 22, the top panel 24, and the bottom panel 26 form a recess with an opening facing a rear end of the front housing 20. The motherboard 40 can thus be fixed vertically on a rear side of the front panel 22 and between the top panel 24 and the bottom panel 26. An installation frame 42 is used to install a hard disk and is fixed on rear sides of the top panel 24 and the bottom panel 26. A CPU 41 and a plurality of memory modules 43 are installed on the motherboard 40 for controlling the desktop computer 10.

Additionally, the display 60 of the present invention is fixed vertically on a front side of the front panel 22 and comprises a metal frame 62, a flat display panel 64, and a plastic cover 66. The metal frame 62 has a squared rear panel 68 and four front flanges 70 fixed on four front edges of the squared rear panel 68. Meanwhile, the squared rear panel 68 and the four front flanges 70 form a squared recess facing a forward direction. The display 60 of the present invention utilizes the squared rear panel 68 of the metal frame 62 in order to be fixed vertically on the front side of the front panel 22 of the front housing 20 in a detachable manner. The display 60 is thus capable of being detached and removed according to a user's requirement. Furthermore, the display 60 has a handle 74 installed on the top of the squared rear panel 68 of the metal frame 62. When the squared rear panel 68 of the metal frame 62 is fixed on the front side of the front panel 22 of the front housing 20, a user is capable of utilizing the handle 74 for carrying the desktop computer 10 handily.

Moreover, the flat display panel 64 in the display 60 is electrically connected to the motherboard 40 and has a front side and a rear side. The front side of the flat display panel 64 is used to display images, and the rear side of the flat display panel 64 is fixed vertically inside the squared recess of the metal frame 62. According to the preferred embodiment of the present invention, the flat display panel 64 is a liquid crystal display panel. Meanwhile, the plastic cover 66 in the display 60 is fixed on a front side of the metal frame 62 for covering a periphery of the metal frame 62. Furthermore, an opening is installed on a front end of the plastic cover 66 for displaying the images of the flat display panel 64.

In addition, the desktop computer 10 according to the present invention further comprises the rear cover 80 installed on the rear end of the front housing 20 for covering the recess on the rear end of the front housing 20. A plurality of pores 82 are installed on the top panel 24 and the bottom panel 26 of the recess of the front housing 20, and top and bottom ends of the rear housing 80 for venting heat generated by the motherboard 40 and the CPU 41 inside the recess of the front housing 20. Moreover, a fan 84 is also installed on the top panel 24 of the front housing 20 adjacent to the pores 82 for upwardly venting the heat from the recess and the rear housing 80. In addition, a plurality of ports 86 are installed near the pores 82 on the top panel 24 of the front housing 20 for connecting other external input/output devices, such as a mouse, a keyboard, a speaker, and a microphone.

Figure 3:
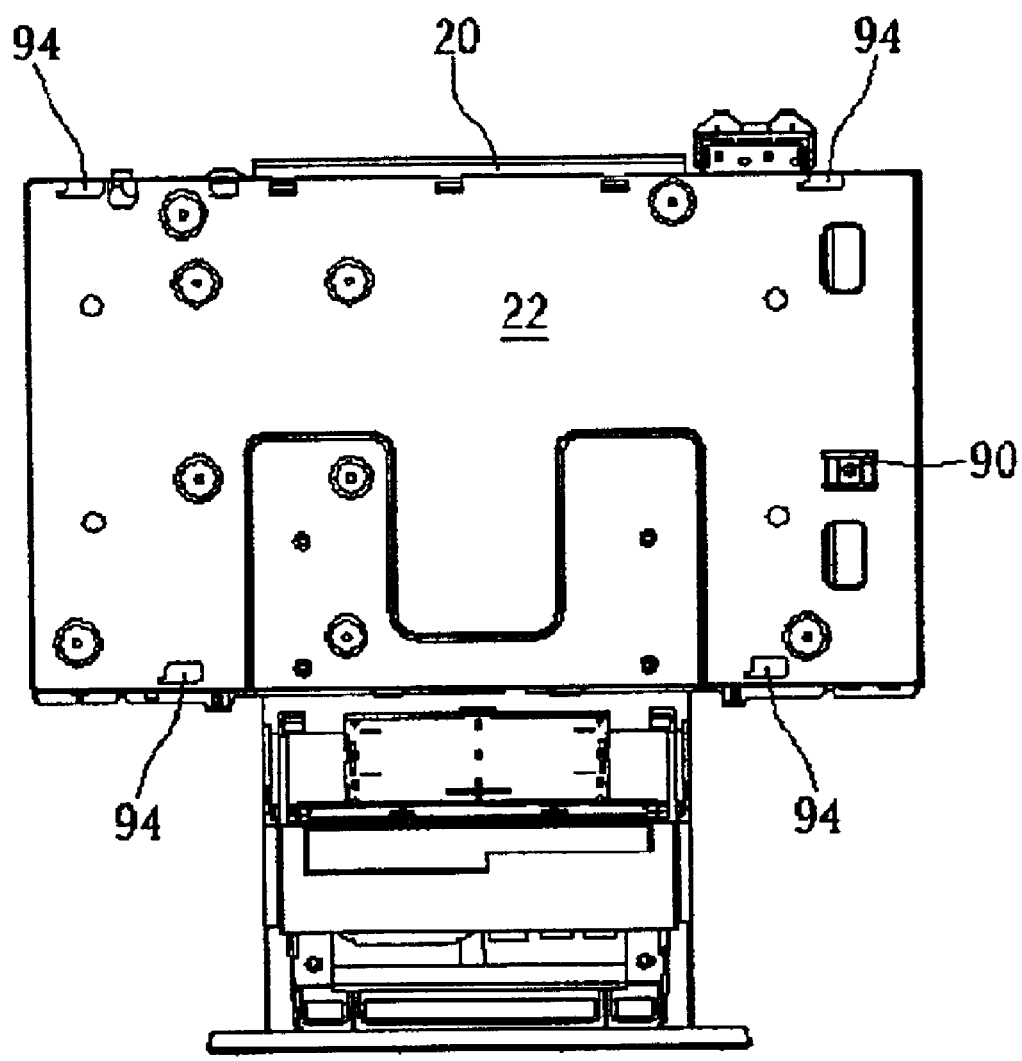
FIG. 3 is a front view of a front housing shown in FIG. 2.
Figure 4:
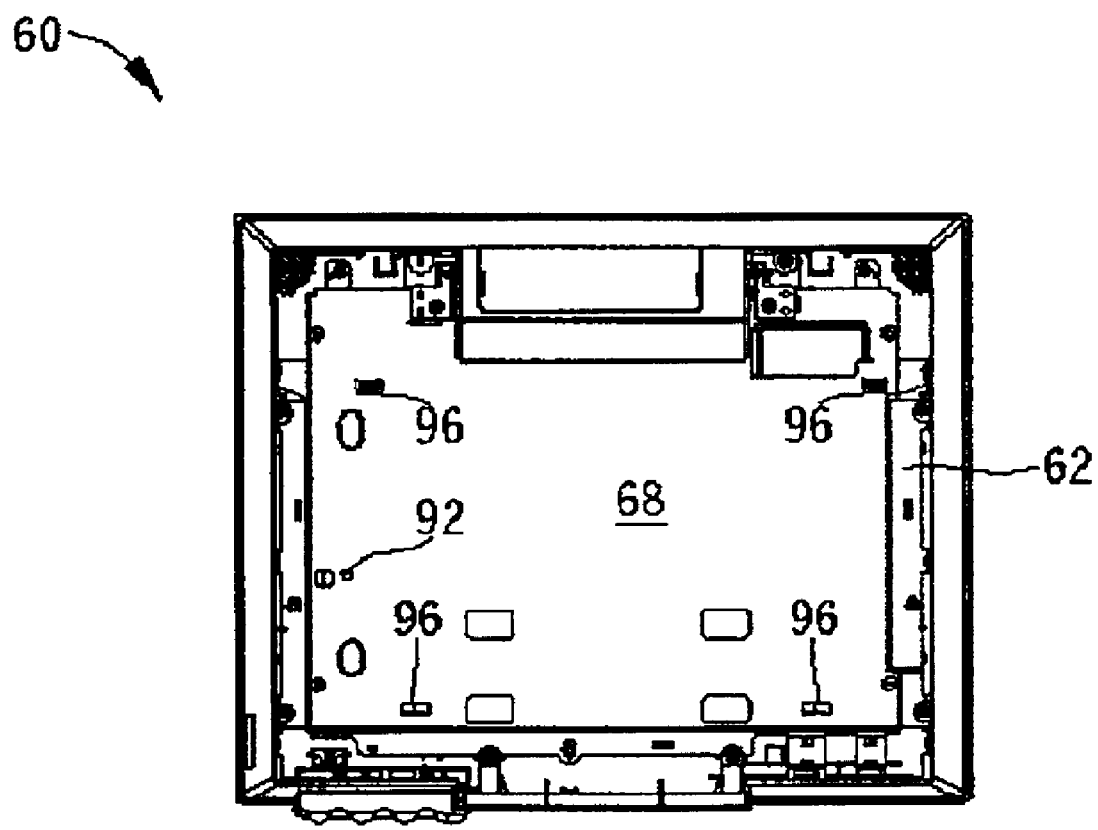
FIG. 4 is a rear view of a display shown in FIG. 2.

Please refer to FIGS. 3 and 4. FIG. 3 is a front view of the front housing 20 shown in FIG. 2. FIG. 4 is a rear view of the display 60 shown in FIG. 2. For detaching the display 60 of the present invention, the squared rear panel 68 of the metal frame 62 of the display 60 and the front panel 22 of the front housing 20 comprise a plurality of sets of latching devices for temporarily clasping the squared rear panel 68 of the metal frame 62 on the front panel 22 of the front housing 20, and a locking device 90 for locking the squared rear panel 68 of the metal frame 62 on the front panel 22 of the front housing 20 so as to prevent the plurality of sets of latching devices from being separated.

Figure 5:
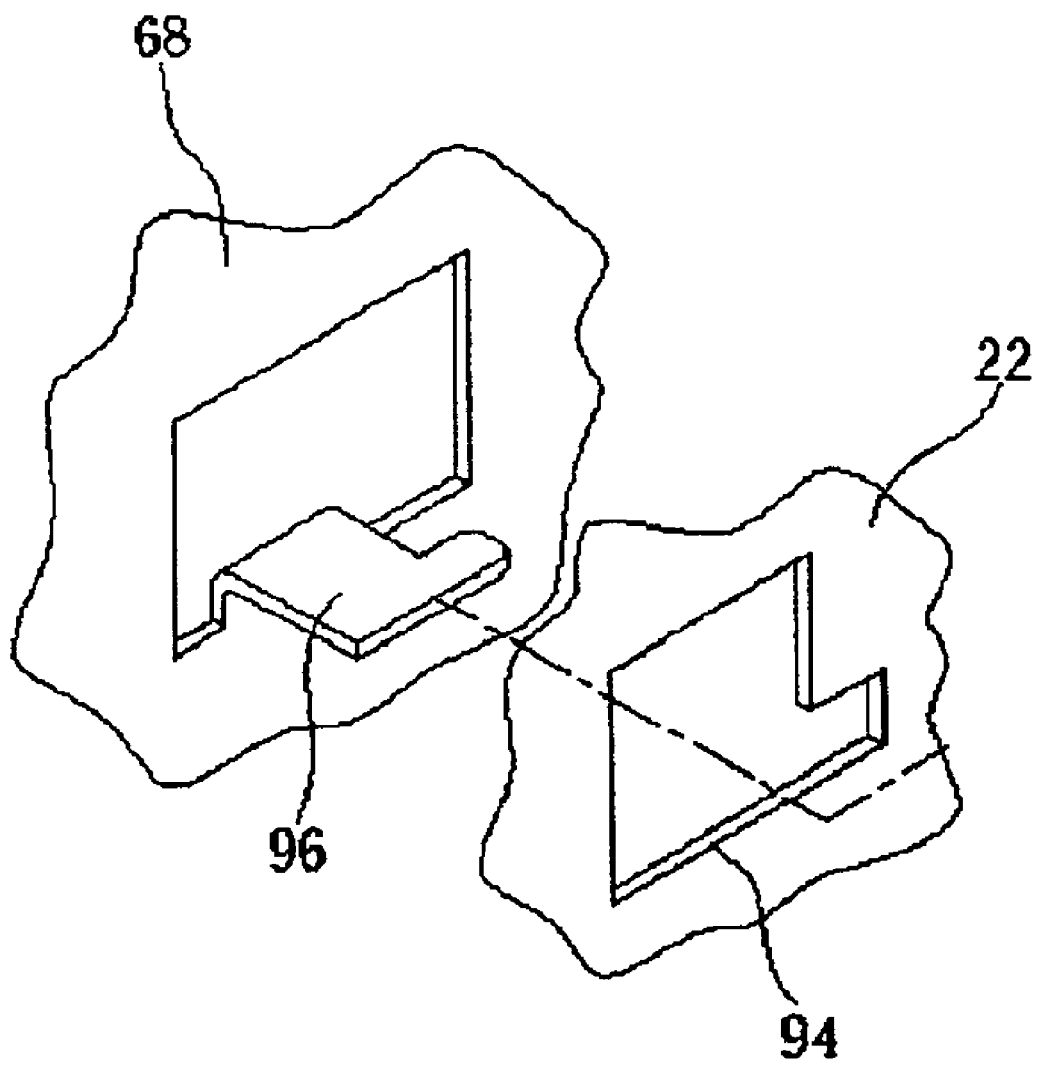
FIG. 5 is a local enlarged diagram of a latching device set when the front housing and the display have not been assembled.
Figure 6:
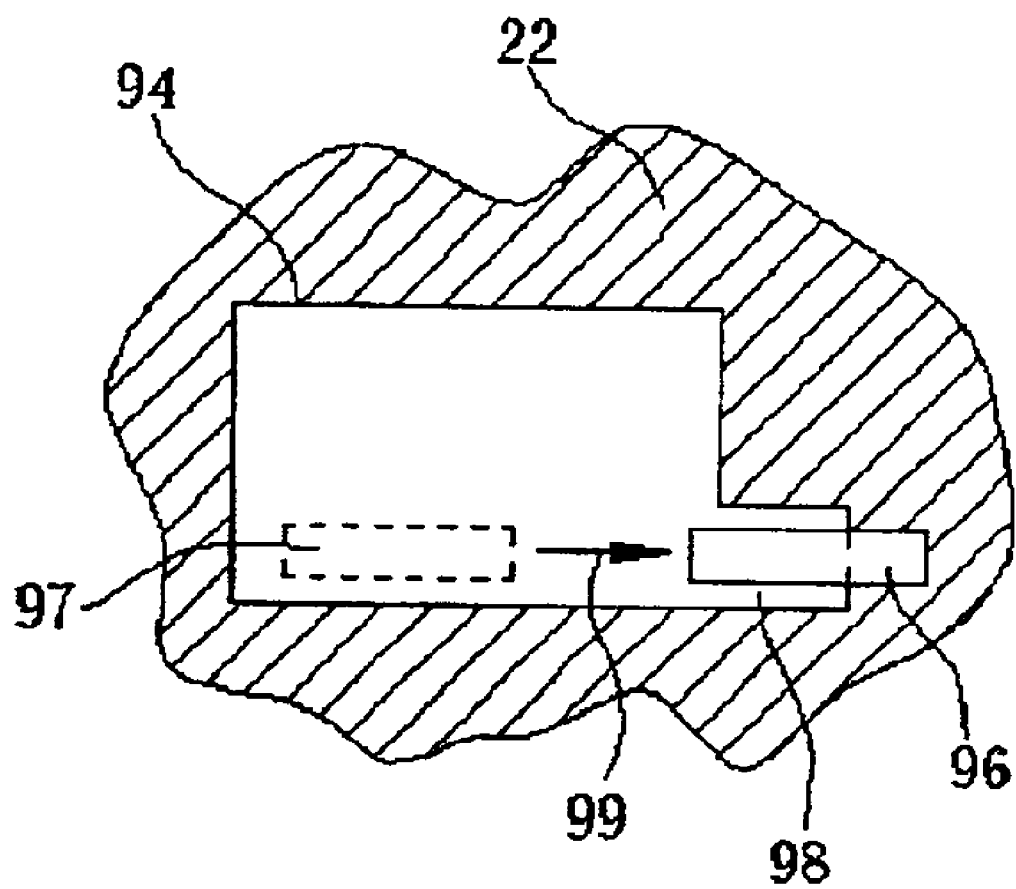
FIG. 6 is a schematic diagram illustrating the course of assembling the front housing and the display.

Please refer to FIGS. 5 and 6. FIG. 5 is a local enlarged diagram of a latching device set when the front housing 20 and the display 60 have not been assembled. FIG. 6 is a schematic diagram illustrating the course of assembling the front housing 20 and the display 60. As shown in FIG. 5, each of the plurality of sets of latching devices comprises a horizontal sliding slot 94 and a flange 96. When the squared rear panel 68 of the metal frame 62 is attached to the front panel 22 of the front housing 20, each of the flanges 96 of the plurality of sets of latching devices is pushed to a position 97 of the horizontal sliding slot 94, and then pushed horizontally along an arrow 99 shown in FIG. 6 to a position 98 so as to be clasped into the corresponding horizontal sliding slot 94. Thereafter, by using the locking device 90, the squared rear panel 68 of the metal frame 62 is locked onto the front panel 22 of the front housing 20 via a hole 92 so as to prevent each of the flanges 96 of the plurality of sets of latching devices from being separated from the corresponding horizontal sliding slot 94. The locking device 90 may be a screw, and in this case then the hole 92 is a screw hole. Thus, turning the screw 90 into the screw hole 92 can lock the squared rear panel 68 of the metal frame 62 onto the front panel 22 of the front housing 20. In addition to the screw, the locking device 90 may be an elastic apparatus. When the squared rear panel 68 of the metal frame 62 is locked onto the front panel 22 of the front housing 20, the elastic apparatus 90 is inserted into the hole 92. Conversely, when a user desires to remove or replace the display 60, the locking device 90 is loosened and the flanges 96 are pushed out of the corresponding horizontal sliding slots 94.

In contrast to the prior art, the desktop computer according to the present invention combines the display with the computer housing so as to decrease the volume and simplify the structure. Furthermore, since the display of the present invention is detachably fixed on the computer housing via the plurality of sets of latching devices and a locking device, the maintenance and the replacement of the display are easier and more feasible. Consequently, the convenience for use of the desktop computer according to the present invention is significantly increased.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A desktop computer comprising:

a pedestal for supporting the desktop computer;

a front housing, the bottom of the front housing being pivotally mounted on the pedestal and tilt-able in a forward-backward direction, the front housing having:

a front panel facing a user;

a top panel fixed on a top edge of the front panel facing one direction; and a bottom panel horizontally fixed on a bottom edge of the front panel facing one direction, the front, top, and bottom panels forming a recess with an opening;

a motherboard fixed on a side of the front panel and between the top and bottom panels, a central processing unit (CPU) and at least a memory module installed on the motherboard for controlling the desktop computer;

a display fixed on a side of the front panel and comprising:

a metal frame having a rear panel fixed on the front side of the front panel of the front housing, and a plurality of front flanges fixed on a plurality of front edges of the rear panel, the rear panel and the front flanges forming a recess facing a forward direction;

a flat display panel electrically connected to the motherboard and having a front side for displaying images, and a rear side fixed inside the recess of the metal frame; and a plastic cover fixed on a front side of the metal frame for covering a periphery of the metal frame, an opening installed on a front end of the plastic cover for displaying the images of the flat display panel; and a rear cover installed on the rear end of the front housing for covering the recess on the rear end of the front housing.

2. The desktop computer of claim 1 wherein the rear panel of the metal frame is detachably fixed on the front side of the front panel of the front housing.

3. The desktop computer of claim 2 wherein the rear panel of the metal frame and the front panel of the front housing comprise a plurality of sets of latching devices for temporarily clasping the rear panel of the metal frame on the front panel of the front housing, and a locking device for locking the rear panel of the metal frame on the front panel of the front housing so as to prevent the plurality of sets of latching devices from being separated.

4. The desktop computer of claim 3 wherein each of the plurality of sets of latching devices comprises a horizontal sliding slot and a flange, so that when the rear panel of the metal frame is attached to the front panel of the front housing, each of the flanges of the plurality of sets of latching devices is pushed horizontally and then clasped into the corresponding horizontal sliding slot, after which the rear panel of the metal frame is locked onto the front panel of the front housing via the locking device so as to prevent each of the flanges of the plurality of sets of latching devices from being separated from the corresponding horizontal sliding slot.

5. The desktop computer of claim 2 wherein the display further comprises a handle installed on the top of the rear panel of the metal frame, so that when the rear panel of the metal frame is fixed on the front side of the front panel of the front housing, a user is capable of utilizing the handle for carrying the desktop computer.

6. The desktop computer of claim 1 wherein the pedestal comprises a slot facing a forward direction for installing a compact disc drive.

7. The desktop computer of claim 1 wherein the flat display panel is a liquid crystal display panel.

8. The desktop computer of claim 1 wherein a plurality of pores are installed on the top and bottom panels of the recess of the front housing, and top and bottom ends of the rear housing for venting heat generated by the motherboard and the central processing unit (CPU) inside the recess of the front housing.

9. The desktop computer of claim 8 further comprising a fan installed on the top panel of the front housing adjacent to the pores for upwardly venting the heat from the recess and the rear housing.

* * * * *